(12) United States Patent  (10) Patent No.: US 8,408,369 B2
Woychowski et al.  (45) Date of Patent: Apr. 2, 2013

(54) BIMETALLIC BRAKE ROTOR

(75) Inventors: Terry J. Woychowski, Commerce Township, MI (US); Tony Argote, Jr., Rochester Hills, MI (US); Ryan E. Ward, Royal Oak, MI (US); Alex Kellner, Davisburg, MI (US); Rory Windrim, Davisburg, MI (US); Robert D. Evoy, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 12/555,024

(22) Filed: Sep. 8, 2009

(65) Prior Publication Data

US 2011/0056777 A1 Mar. 10, 2011

(51) Int. Cl.
*F16D 65/12* (2006.01)
(52) U.S. Cl. .................................. 188/218 XL
(58) Field of Classification Search ............. 188/18 A, 188/218 XL
See application file for complete search history.

(56) References Cited

U.S. PATENT DOCUMENTS

| | | | | |
|---|---|---|---|---|
| 2,255,024 A * | 9/1941 | Eksergian | ............... | 188/218 XL |
| 3,613,851 A * | 10/1971 | Ely et al. | ................... | 192/107 R |
| 3,724,613 A * | 4/1973 | Bermingham | ........... | 188/218 XL |
| 4,049,090 A * | 9/1977 | Buell | ....................... | 188/251 M |
| 4,072,219 A * | 2/1978 | Hahm et al. | ............. | 188/218 XL |
| 4,177,883 A * | 12/1979 | Margetts | ................ | 188/218 XL |
| 4,613,021 A * | 9/1986 | Lacombe et al. | ........ | 188/218 XL |
| 4,930,606 A | 6/1990 | Sporzynski et al. | | |
| 5,092,443 A * | 3/1992 | Nomura | .................... | 192/107 M |
| 5,183,632 A * | 2/1993 | Kiuchi et al. | .................... | 419/48 |
| 5,224,572 A | 7/1993 | Smolen, Jr. et al. | | |
| 5,509,510 A * | 4/1996 | Ihm | ......................... | 188/218 XL |
| 5,626,211 A | 5/1997 | Gewelber et al. | | |
| 5,769,185 A * | 6/1998 | Main et al. | .................. | 188/18 A |
| 5,862,892 A * | 1/1999 | Conley | ..................... | 188/218 XL |
| 5,878,843 A * | 3/1999 | Saum | ...................... | 188/218 XL |
| 5,884,388 A | 3/1999 | Patrick et al. | | |
| 6,241,055 B1 * | 6/2001 | Daudi | ....................... | 188/73.35 |
| 6,935,470 B1 * | 8/2005 | Smith, Jr. | ................ | 188/218 XL |
| 7,090,057 B2 * | 8/2006 | Fryska et al. | ................ | 188/71.5 |
| 7,159,698 B2 * | 1/2007 | Banks et al. | ............ | 188/218 XL |
| 2003/0209288 A1 | 11/2003 | Huang | | |
| 2004/0084260 A1 * | 5/2004 | Hoyte et al. | ............. | 188/218 XL |
| 2004/0178029 A1 * | 9/2004 | Hoyte et al. | ............. | 188/218 XL |
| 2005/0183909 A1 * | 8/2005 | Rau et al. | ................ | 188/218 XL |
| 2006/0076200 A1 * | 4/2006 | Dessouki et al. | ........ | 188/218 XL |
| 2008/0060891 A1 * | 3/2008 | Chen et al. | .............. | 188/218 XL |
| 2010/0065388 A1 * | 3/2010 | Kleber | ..................... | 188/218 XL |

FOREIGN PATENT DOCUMENTS

CN 1535361 A 10/2004

* cited by examiner

*Primary Examiner* — Bradley King
*Assistant Examiner* — Nicholas J Lane

(57) ABSTRACT

A bimetallic brake rotor includes a rotor body composed of a first material and a pair of cheek inserts serving as the rotor cheeks, being composed of a second material less dense than the first material. Each of the cheek inserts has a first sequence of slots and teeth, and a disc component of the rotor body has a second sequence of slots and teeth on each side thereof which mesh with the first sequence such that a radial edge interface is provided at each adjoining tooth and slot which transfers braking heat and mechanical loading from the cheek inserts to the rotor body.

5 Claims, 4 Drawing Sheets

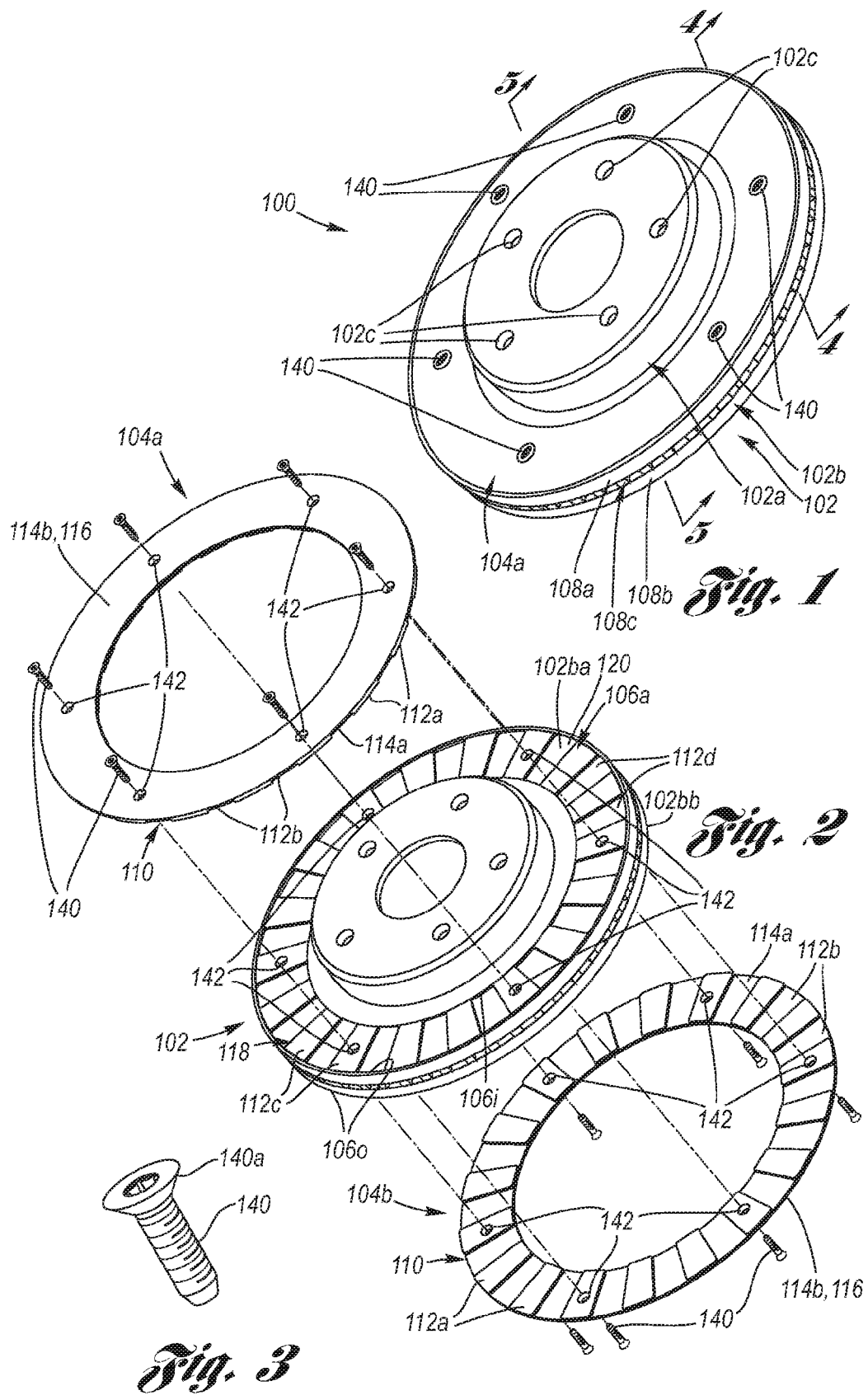

BIMETALLIC BRAKE ROTOR

TECHNICAL FIELD

The present invention relates, in general, to brake rotors used in motor vehicle applications, and more particularly to a bimetallic brake rotor.

BACKGROUND OF THE INVENTION

A conventional disc brake system serves to slow translational motion of vehicles by converting the kinetic energy of the vehicle motion into heat. In conventional disc brake systems, the brake rotor includes a hat connected to an axle and a disc connected to the hat, the disc having on each side thereof a cheek upon which is opposingly applied a frictional force by brake pads of a brake caliper connected to a non-rotating component of the motor vehicle, whereby rotation of the wheel is slowed or stopped.

Conventional brake rotors of disc brake systems have been engineered to be strong, durable with respect to frictional wear. Further, conventional brake rotors are generally constructed of materials which have a high heat capacity so as to enable efficient management heat generated during frictional slowing of the motor vehicle.

Material costs have always been an important design consideration, particularly as they relate to vehicle fuel mileage. This trend has become so important that automotive engineers routinely take into account how an engineering change may affect vehicle fuel mileage.

With respect to vehicle fuel mileage, generally lighter vehicles translate into higher fuel mileage vehicles. Conventional brake rotors are constructed of homogeneous grey iron, commonly also referred to as cast iron, being generally an alloy of carbon, silicon and iron, having a mass on the order of about twenty-five pounds each. Therefore, for example, a motor vehicle equipped with four wheel disc brakes would utilize four brake rotors, totaling about one-hundred pounds, and constituting a significant proportion of the gross vehicle weight. Additionally, conventional brake rotors have an affect on vehicle dynamics, wherein, for example, lighter brake rotors would, in general, allow engineers to use lighter suspension components, thereby further reducing the gross vehicle weight.

Exotic materials, such as titanium, have properties of hardness and heat capacity superior to grey iron found in conventional brake rotors, and are routinely used in certain applications, such as aerospace. However, the cost of exotic materials renders simple substitution in mass-market products, such as motor vehicles, prohibitive.

Inexpensive metals, such as aluminum and aluminum-ceramic composites, have been used in motor vehicle brake rotors, as for example disclosed in U.S. Pat. Nos. 5,183,632; 5,224,572 and 5,884,388. Aluminum rotors have been found to possess a heat capacity which would render suitability in that regard; however, aluminum is much softer than iron based materials. Even if some surface hardening techniques, such as heat treating, could create a surface hardened case of aluminum substrate, the resultant aluminum-based material would still be significantly softer than grey iron-based materials.

Another strategy to reduce brake rotor mass in the prior art is to create areas of distinct homogenous regions of the base metals. Known casting techniques make it possible to cast adjacent materials without an alloying therebetween. For example, U.S. Pat. No. 4,930,606 discloses a composite brake rotor having a hat section including a non-planar rim to which is cast a rotor discoid which provides the rotor cheeks, wherein the rotor discoid is bonded to the rim of the hat section. The disclosure indicates that these rotors have a very uniform distribution of stress, so they are particularly resistant to mechanical and thermal stresses.

Another technique that creates distinct homogeneous regions of metal in a casting is discussed in U.S. Patent Application Publication 2003/00209288, wherein a method of manufacturing clad components consisting of two layers of metals is disclosed. A metallic substrate (i.e., a metallic sheet such as steel) has metal beads firmly bonded to the surface thereof via necks in the beads. The metal substrate with beads is placed into a mold, and a second metal, in a molten state, is then poured into the mold on top of the first metal substrate and is allowed to cool, forming a firm interlocking structure between the two metals via the necks of the beads, which may include metallurgical bonding. In this approach, for example, a steel surfaced aluminum brake rotor may be provided which is operable to a temperature over 1,400 degrees F. according to dynamometer tests, as recounted in the disclosure.

Accordingly, what remains needed in the art is a composite brake rotor that meets acceptable wear resistance and heat capacity standards while reducing the mass of the brake rotor when compared to conventional grey iron brake rotors and avoiding the problems associated with different materials surface boundaries bonding.

SUMMARY OF THE INVENTION

The present invention is a bimetallic brake rotor that meets acceptable wear resistance and heat capacity standards, while reducing the mass of the brake rotor when compared to conventional grey iron brake rotors and avoiding different materials bonding.

The bimetallic brake rotor according to the present invention includes a rotor body composed of a first material and a pair of cheek inserts composed of a second material, wherein the first material is less dense than is the second material. The rotor body constitutes the hat and disc components of the bimetallic brake rotor, which are mutually connected, preferably integrally. The disc component is provided with an annular insert recess on each side thereof, wherein each cheek insert is generally configured in the form of a flat ring dimensioned to seat into its respective insert recess so as to thereby serve as the rotor cheeks, constituting the exclusive contact surface of the bimetallic brake rotor with respect to the brake pads of the brake caliper of the braking system of the motor vehicle.

Since the rotor body is not subjected to braking friction, the first material is chosen for strength with low density (i.e., less weight) and good heat capacity and heat transfer properties, such as provided by aluminum, rather than for frictional wear and hardness properties. In contrast, since the cheek inserts are subjected to braking friction wear and brake pad contact forces, the second material is chosen for strength, hardness and frictional wear resistance, such as provided by grey iron.

In order that the angular forces of braking are transmitted from the cheek inserts directly to the rotor body, a first tooth and slot sequence of sequentially alternating teeth and slots is provided on the inside surface of the cheek inserts and a second tooth and slot sequence, reciprocal to the first sequence, of sequentially alternating teeth and slots is provided at the floor of each of the insert recesses. When each cheek insert is seated in it respective insert recess, the first and second tooth and slot sequences mesh and gearlingly engage, wherein the clockwise or counterclockwise (depending on direction of wheel rotation) radial edge interface of the adjoining teeth/slots carries and transfers the angular force load of braking from the cheek inserts to the rotor body.

In a preferred form of the bimetallic brake rotor according to the present invention, a plurality of threaded fasteners hold the cheek inserts seated in their respective insert recesses, but are not intended to transmit angular braking forces from the cheek inserts to the rotor body, which transmission is provided by the aforementioned radial edge interfaces of the teeth and slots. In another form of the bimetallic brake rotor according to the present invention, the cheek inserts are press-fit with respect to the respective insert recesses.

The heat generated in the braking process will flow from the cheek inserts to the rotor body of the bimetallic brake rotor. Further, the transfer of both mechanical and heat loads from the cheek inserts to the rotor body are facilitated by the radial edge interfaces of the teeth and slots.

Further, since radial edge interfaces of the teeth and slots is free of bonding, the first and second materials may have different thermal expansion properties, allowing for an independence of choice of the first and the second materials not possible in the prior art.

Accordingly, the present invention provides a bimetallic brake rotor which has a significant weight reduction as compared with a conventional grey iron brake rotor, while possessing similar frictional wear and thermal management characteristics.

This and additional objects, features and advantages of the present invention will become clearer from the following specification of a preferred embodiment.

BRIEF DESCRIPTION OF THE DRAWINGS

FIG. 1 is a perspective view of a bimetallic brake rotor according to the present invention.

FIG. 2 is an exploded perspective view of the bimetallic brake rotor of FIG. 1.

FIG. 3 is a perspective view of a fastener according to the present invention.

DESCRIPTION OF THE PREFERRED EMBODIMENT

Figure 4:
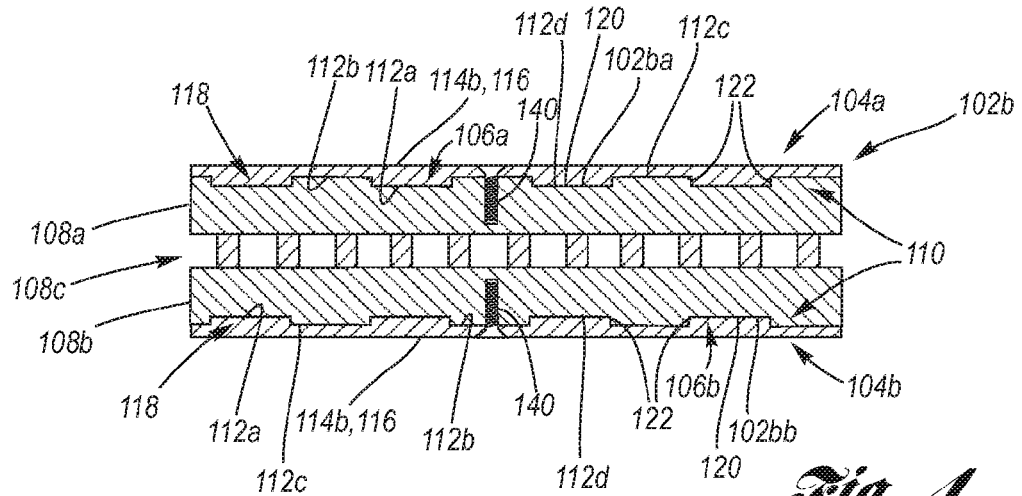
FIG. 4 is a sectional view, taken along line 4-4 of FIG. 1.
Figure 5:
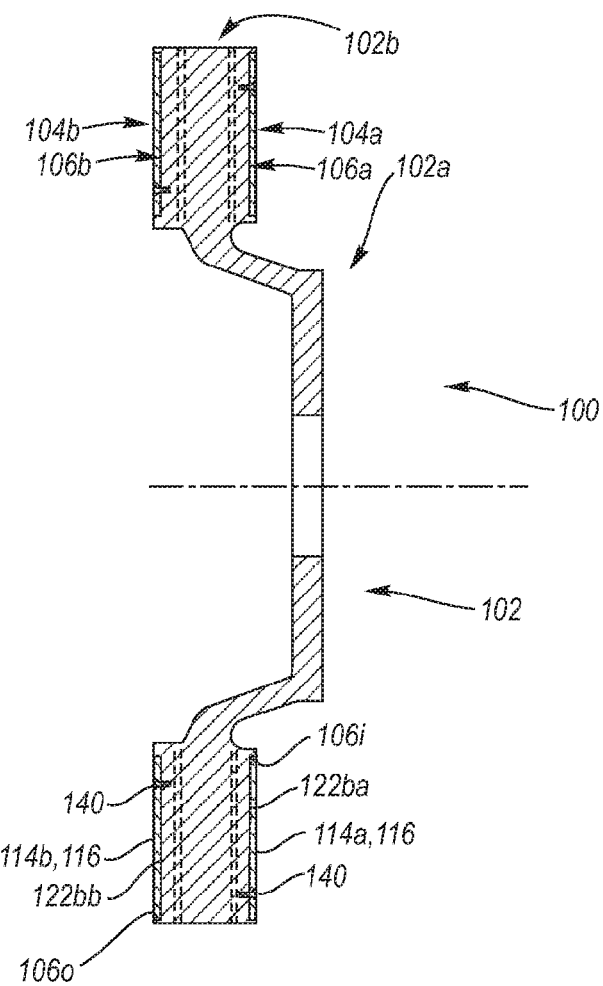
FIG. 5 is a sectional view, taken along line 5-5 of FIG. 1.
Figure 6A:
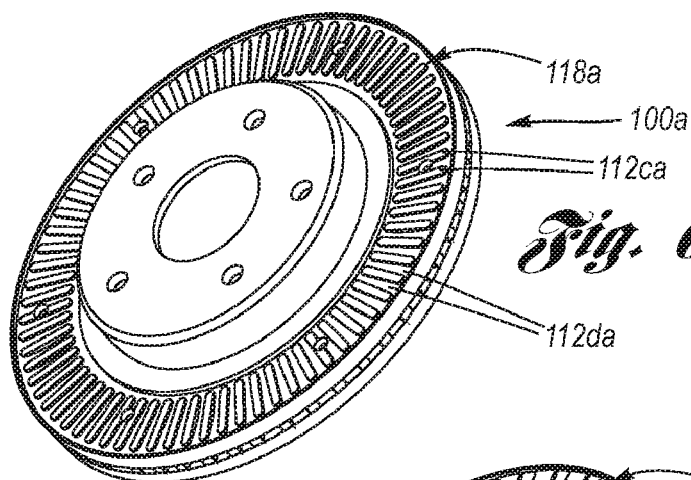
FIGS. 6A and 6B are perspective views of alternative tooth/slot arrangements for a rotor body according to the present invention.
Figure 6B:
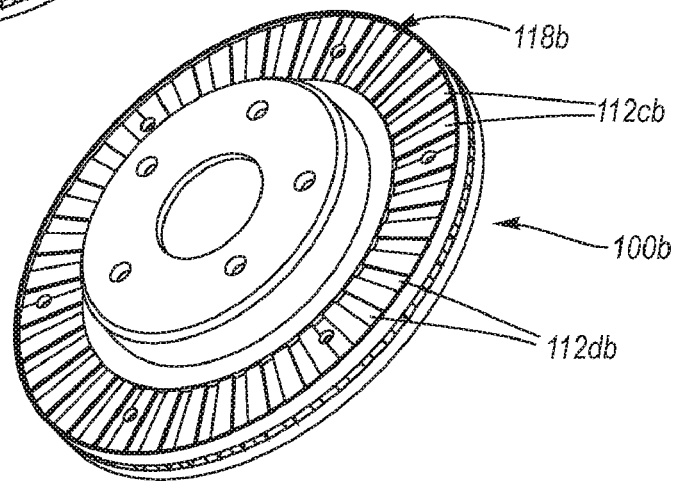

Referring now to the Drawing, FIGS. 1 through 10 depict exemplar aspects of a bimetallic brake rotor according to the present invention.

As shown at FIGS. 1 through 5, the bimetallic brake rotor 100 includes a rotor body 102 and a pair of cheek inserts 104a, 104b. The rotor body 102 is composed of a first material and the pair of cheek inserts 104a, 104b are both composed of a second material, wherein the first material is less dense (lighter in weight) than is the second material.

The rotor body 102 includes a hat component 102a and a connected, preferably integrally connected, disc component 102b. The hat component 102a has a preferably conventional configuration with lug holes 102c for connecting to an axle hub of a motor vehicle. The disc component 102b preferably includes a pair of rotor discs 108a, 108b mutually interconnected by a plurality of generally radially extending vent vanes 108c, wherein the geometry of the vanes may be conventional or otherwise, and the present invention is not limited to vented rotor discs.

According to the present invention, the disc component 102b is provided with an annular insert recess 106a, 106b, respectively, on each outer side 102ba, 102bb thereof (i.e., at the outer side of each of the rotor discs 108a, 108b, respectively), wherein each insert recess is defined by an inner peripheral wall 106i and, preferably, an outer peripheral wall 106o.

Figure 7:
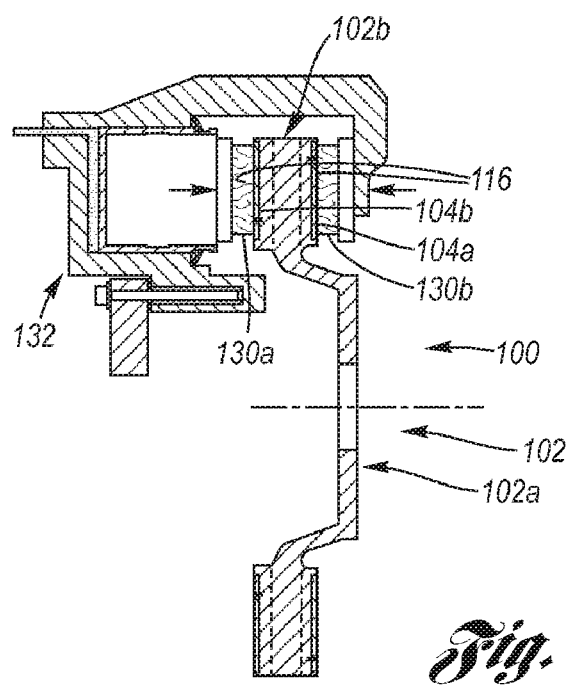
FIG. 7 is a sectional view of the bimetallic brake rotor, as seen at FIG. 5, now shown in operation with respect to a brake caliper of a baking system of a motor vehicle.

The cheek inserts 104a, 104b are generally configured in the form of flat rings and are dimensioned to seat into each insert recess 106a, 106b, respectively. As can be seen at FIG. 7, the cheek inserts 104a, 104b serve as the rotor cheeks by exclusively providing the brake pad contact surface (rotor cheek) 116 of the bimetallic brake rotor 100 with respect to the brake pads 130a, 130b of the brake caliper 132 of the braking system of the motor vehicle.

A first tooth and slot sequence 110 of sequentially alternating teeth 112a and slots 112b is provided on the inside surface 114a of the cheek inserts 104a, 104b, wherein the opposite, outer surface 114b is the brake pad contact surface (rotor cheek) 116 for frictional interfacing with the brake pad of the brake caliper. A second tooth and slot sequence 118 of teeth 112c and slots 112d is provided at the floor 120 of each of the insert recesses 106a, 106b, wherein the sequential alternation of the teeth and slots thereof is reciprocal to that of the first tooth and slot sequence 110. In this regard, when each cheek insert is seated in its respective insert recess, the teeth and slots of the first and second sequences 110, 118 mutually mesh and gearingly engage. As such during braking, the clockwise or counterclockwise (depending on direction of wheel rotation) radial edge interface 122 of adjoining teeth/slots of the first and second tooth and slot sequences carries and transfers the angular force load of braking from the cheek inserts to the rotor body.

The geometry of the cheek inserts and the respective insert recesses, as well as the number, and/or geometry, of the teeth and slots of the first and second tooth and slot sequences may be selected to best suit a particular application of the bimetallic brake rotor. By way of non-limiting examples, the bimetallic brake rotor 100a shown at FIG. 6A has much narrower teeth 112ca and slots 112da of the second tooth and slot sequence 118a (wherein the first tooth and slot sequence being reciprocal thereto) than those shown at FIG. 2, and the bimetallic brake rotor 100b shown at FIG. 6B has somewhat narrower teeth 112cb and slots 112 db of the second tooth and slot sequence 118b (again wherein the first tooth and slot sequence being reciprocal thereto) than those shown at FIG. 2.

The selection of the first and second materials is based upon the respective operational considerations of the rotor body 102 and the cheek inserts 104a, 104b.

The rotor body 102 must be composed of a first material strong enough to withstand the forces experienced at the hat component 102a where lug nuts of the axle hub are attached, and further withstand at the disc component 102b the deceleration forces of the caliper brake pads when braking is requested, as well as the angular force loading at the teeth/slots radial edge interfaces 122. However, since no portion of the rotor body 102 is subjected to brake pads contact, nor to braking friction, the first material is chosen by criteria including low density (i.e., less weight) and good heat capacity and heat transfer properties, rather than for frictional wear and hardness properties. A preferred first material is aluminum in that it has the required strength, low cost and excellent heat handling characteristics.

On the other hand, the cheek inserts 104a are directly subjected to braking friction wear and brake pad contact forces at the outer surface outer surface 114b which serves as the brake pad contact surface (rotor cheek) 116, the second material is chosen by criteria including hardness and frictional wear resistance. A preferred material is grey iron, in that this is the customary material used with excellent result for brake rotors in the prior art.

The bimetallic brake rotor 100 shown at FIGS. 1 through 7 utilizes a plurality of threaded fasteners 140 which pass through insert holes 142 in the cheek inserts 104a, 104b and then thread into threaded disc holes 144 of the disc component 102b (i.e., into the respective first and second rotor discs 108a, 108b) so as to hold the cheek inserts 104a, 104b seated in their respective insert recesses 106a, 106b, but are not intended to transmit angular braking forces from the cheek inserts to the rotor body, which transmission is provided by the aforementioned radial edge interface 122 of the first and second tooth and slot sequences. The threaded fasteners 140 have a head 140a which is recessed with respect to the shape of the insert holes 142 so as to not adversely wear the brake pads during braking, as shown at FIGS. 4 and 7. While threaded fasteners are preferred, other fasteners may be used, such as for non-limiting example rivets.

EXAMPLE I

Operational suitability of the bimetallic brake rotor was investigated using computer aided finite element analysis on a bimetallic brake rotor 100 as shown at FIG. 1, having an aluminum rotor body 102, grey iron cheek inserts 104a, 104b, and having the following geometric aspects: the first and second tooth and slot sequences 110, 118 have 18 teeth and 18 slots, each having an angular width of 10 degrees; the rotor body has a diameter of 330 mm., the cheek inserts have a radial length of 42.5 millimeters, and a thickness of 5 millimeters; and the teeth have a height, and the slots have a depth, of 2.5 millimeters. The six threaded fasteners 140 have a length of 20.5 millimeters.

With regard to the hat component 102a, stress around the lug holes under a "worst case" braking load condition of a fully loaded pick-up truck with a 65% mass transfer to the front of the vehicle and under a "worst case" thermal load was analyzed. It was determined that the maximum stress was 134 MPa, which is well below the yield stress of 276 MPa for the aluminum of the rotor body.

With regard to the rotor component 102b, stress at the radial edge interface 122 under a "worst case" braking load condition of a fully loaded pick-up truck with a 65% mass transfer to the front of the vehicle and under a "worst case" thermal load was analyzed. It was determined that the maximum stress was 577 MPa as measured on three of a total of 18 tooth/slot radial edge interfaces, wherein if all 18 tooth/slot radial edge interfaces were load bearing, then the stress would be distributed among all 18 of them such that the stress would be well below the yield stress of 276 MPa for the aluminum of the rotor body.

It will be seen that since the rotor body is lightweight (i.e., aluminum) and since it constitutes the bulk of the bimetallic brake rotor mass, its lesser density (as compared to a conventional homogeneous grey iron rotor) contributes to an overall lightness of the bimetallic brake rotor. For example, if a conventional grey iron brake rotor weighed about 25 pounds, a dimensionally similar bimetallic brake rotor according to the present invention having aluminum as the first material and grey iron as the second material, may weigh between about 12 and 13 pounds, providing essentially a 50% mass (weight) savings for the brake rotors of the motor vehicle (i.e., a set of four bimetallic brake rotors would weigh about 50 pounds, as compared to a conventional brake rotor set which would weigh about 100 pounds).

The heat generated in the braking process will initially increase the temperature of the cheek inserts. However, this temperature will be managed by heat flow from the cheek inserts to the rotor body of the bimetallic brake rotor by mainly conductive heat transfer. In this regard, the tooth and slot radial edge interfaces 122 facilitate transfer of both the thermal and the mechanical loads between the cheek inserts and the rotor body of the bimetallic brake rotor.

Further, since the teeth and slots meshing and gearing engagement as between the first tooth and slot sequence of the cheek inserts and the second tooth and slot sequence at the insert recesses of the disc component provide radial edge interfaces 122 free of bonding, the first and second materials may have different thermal expansion properties, allowing for an independence of choice of the first and the second materials not possible in the prior art.

Figure 8:
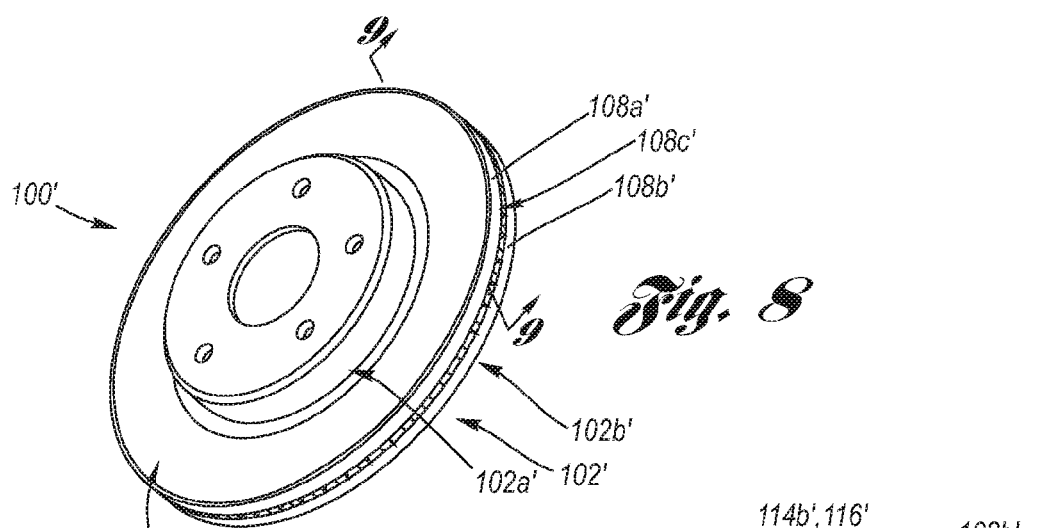
FIG. 8 is a perspective view of a bimetallic brake rotor according to an alternative embodiment of the present invention.
Figure 9:
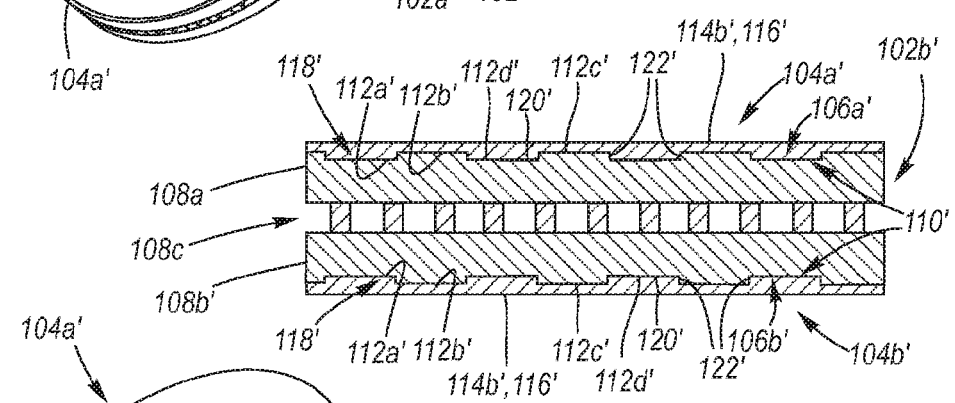
FIG. 9 is a sectional view, taken along line 9-9 of FIG. 8.
Figure 10:
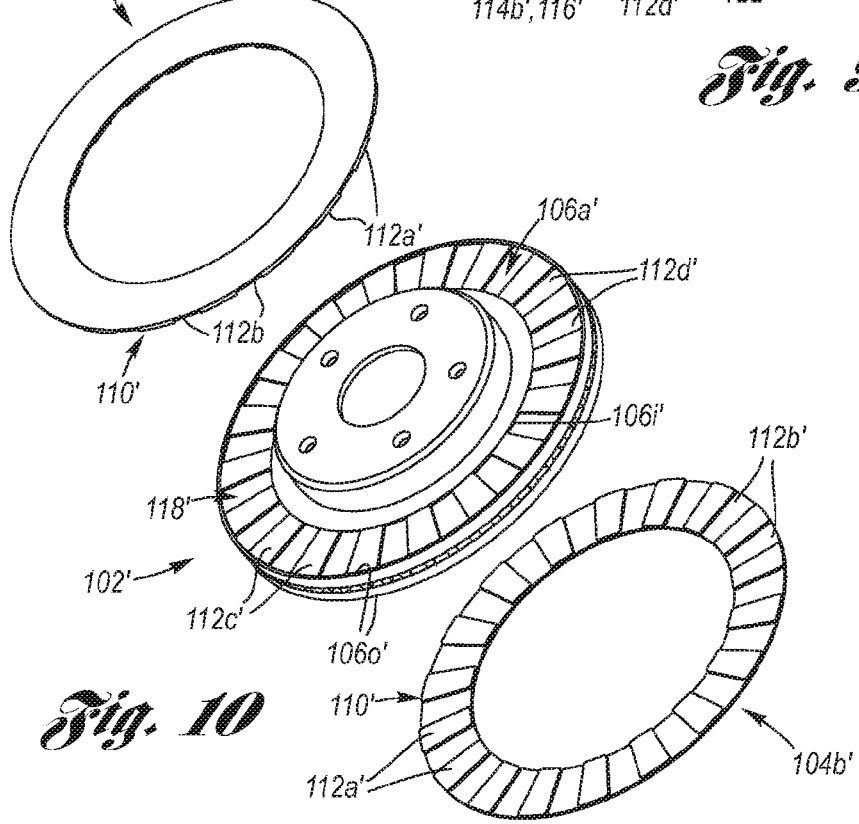
FIG. 10 is an exploded perspective view of the alternative bimetallic brake rotor of FIG. 8.

The bimetallic brake rotor 100 shown at FIGS. 1 through 7 is preferred, having a plurality of threaded fasteners 140 to hold the cheek inserts seated in their respective insert recesses; however a press fit may be used instead, as shown at FIGS. 8 through 10.

Turning attention now to FIGS. 8 through 10, an alternative bimetallic brake rotor 100' is shown having a rotor body 102' and cheek inserts 104a', 104b', wherein like parts to those of FIGS. 1 through 5 are like numbered with a prime. The bimetallic brake rotor 100' is structured and functions as generally described above, except now there are no insert holes, no disc holes and no threaded fasteners, wherein now the cheek inserts 104a', 104b' are retained seated in the insert recesses 106a', 106b' by a press-fit. In this regard, the first and second tooth and slot sequences 110', 118' are mutually dimensioned to be mutually press-fitting, and the cheek inserts 104a', 104b' are further press-fit with respect to the inner and outer peripheral walls 106i', 106o' so as to thereby hold the cheek inserts seated in the insert recesses without threaded fasteners.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A bimetallic brake rotor, comprising:
a rotor body comprising a disc component having first and second outer sides, said rotor body being composed of a first material;
an annular first cheek insert having an inner side and an outer side, said first cheek insert being composed of a second material;
an annular second cheek insert having an inner side and an outer side, said second cheek insert being composed of said second material;
a first tooth and slot sequence of sequentially alternating teeth and slots disposed, respectively, on the inside surface of each of said first and second cheek inserts;
a second tooth and slot sequence of sequentially alternating teeth and slots, reciprocal to said first tooth and slot sequence, disposed, respectively, on each of said first and second outer sides of said disc component; and a pair of insert recesses, one insert recess, respectively, being disposed at each of said first and second outer sides of said disc component, each insert recess of said pair of insert recesses being defined by an inner peripheral wall, an outer peripheral wall and a floor extending between said inner and outer peripheral walls, wherein the second tooth and slot sequence of each of the first and second outer sides is disposed at said floor of each said insert recess;

wherein the first tooth and slot sequence of said first cheek insert is meshed with the second tooth and slot sequence of said first outer surface of said disc component such that a radial edge press-fit interface is disposed at each adjoining tooth and slot, wherein the press-fit holds said first cheek insert seated in its respective insert recess; and wherein the first tooth and slot sequence of said second cheek insert is meshed with the second tooth and slot sequence of said second outer surface of said disc component such that a radial edge press-fit interface is disposed at each adjoining tooth and slot, said radial edge interface being oriented in orthogonal relation to said floor of each said insert recess, wherein the press-fit holds said second insert seated in its respective insert recess.

2. The bimetallic brake rotor of claim 1, wherein said first material has a density less than that of said second material.

3. The bimetallic brake rotor of claim 2, wherein said first material is aluminum and said second material is grey iron.

4. A bimetallic brake rotor, comprising:

a rotor body comprising a disc component having first and second outer sides and a hat component connected to said disc component, said rotor body being composed of a first material;

an annular first cheek insert having an inner side and an outer side, said first cheek insert being composed of a second material;

an annular second cheek insert having an inner side and an outer side, said second cheek insert being composed of said second material;

a first tooth and slot sequence of sequentially alternating teeth and slots disposed, respectively, on the inside surface of each of said first and second cheek inserts;

a second tooth and slot sequence of sequentially alternating teeth and slots reciprocal to said first tooth and slot sequence disposed, respectively, on each of said first and second outer sides of said disc component;

a pair of insert recesses, one insert recess, respectively, being disposed at each of said first and second outer sides of said disc component, each insert recess of said pair of insert recesses being defined by an inner peripheral wall, an outer peripheral wall and a floor extending between said inner and outer peripheral walls, wherein the second tooth and slot sequence of each of the first and second outer sides is disposed at said floor of each said insert recess, wherein each of said first and second cheek inserts is seatably received in a respective insert recess when the first and second tooth and slot sequences are meshed; and a plurality of fasteners connected with said first and second cheek inserts and with said disc component retaining each of the first and second cheek inserts seated in its respective insert seat;

wherein the first tooth and slot sequence of said first cheek insert is meshed with the second tooth and slot sequence of said first outer surface of said disc component, wherein the first tooth and slot sequence of said second cheek insert is meshed with the second tooth and slot sequence of said second outer surface of said disc component, and wherein a radial edge interface is disposed at each adjoining tooth and slot, said radial edge interface being oriented in orthogonal relation to said floor of each said insert recess; and wherein said first material has a density less than that of said second material.

5. The bimetallic brake rotor of claim 4, wherein said first material comprises aluminum and said second material comprises grey iron.

* * * * *